US006809197B1

(12) United States Patent
Woo et al.

(10) Patent No.: US 6,809,197 B1
(45) Date of Patent: Oct. 26, 2004

(54) EMULSION STABILIZING STARCH PRODUCTS

(75) Inventors: Kyungsoo Woo, Platte City, MO (US); Clodualdo Maningat, Platte City, MO (US); Sukh Bassi, Atchison, KS (US)

(73) Assignee: MGP Ingredients, Inc., Atchison, KS (US)

(*) Notice: Subject to any disclaimer, the term of this patent is extended or adjusted under 35 U.S.C. 154(b) by 0 days.

(21) Appl. No.: 10/459,191

(22) Filed: Jun. 11, 2003

(51) Int. Cl.[7] .............................................. C08B 31/00
(52) U.S. Cl. ...................... 536/106; 127/33; 106/207.1; 106/207.2; 106/207.3
(58) Field of Search .......................... 536/106; 127/33; 106/207.1, 207.2, 207.3

(56) References Cited

U.S. PATENT DOCUMENTS

| | | | |
|---|---|---|---|
| 2,461,139 A | | 2/1949 | Caldwell |
| 2,661,349 A | | 12/1953 | Caldwell et al. |
| 4,626,288 A | * | 12/1986 | Trzasko et al. .......... 106/206.1 |
| 5,151,264 A | | 9/1992 | Samain et al. |
| 5,256,404 A | | 10/1993 | Martino et al. |
| 5,736,371 A | | 4/1998 | Samain et al. |
| 5,855,946 A | | 1/1999 | Seib et al. |
| 5,858,993 A | | 1/1999 | Pickart |
| 5,882,713 A | | 3/1999 | Eskins et al. |
| 5,891,475 A | | 4/1999 | Perrin et al. |
| 5,968,794 A | | 10/1999 | Samain et al. |
| 6,299,907 B1 | * | 10/2001 | Seib et al. .................. 424/499 |
| 2002/0168408 A1 | | 11/2002 | Samain et al. |

FOREIGN PATENT DOCUMENTS

DE 3230716 A1 * 2/1984 ............. C08L/3/02

EP 0 761 691 A2 12/1997

OTHER PUBLICATIONS

Modified Starches: Properties and Uses; O.B. Wurzburg; pp. 132–147, no date provided.
Starch: Chemistry and Technology; Roy Whistler, James Bemiller, and Eugene Paschall; pp. 341–343;(1984), no month provided.
Studies of Starch Esterification: Reactions with Alkenylsuccinates in Aqueous Slurry Systems; Young–Seaon Jeon, Arvind Visawanathan, and Richard Gross, pp. 90–93;(1999), no month provided.
Distribution of Octenyl Succinate Groups in Octenyl Succinic Anhydride Modified Waxy Maize Starch; Randal Shogren, Arvind Viswanathan, Frederick Felker, and Richard Gross; pp. 196–2004;(2000), no month provided.
Protection of Unstable Vitamins, Enzymes and Natural Free Radical Scavengers By Novel Delivery Systems; L. Ding; Personal Care Ingredients Asia, vol. 1,(Apr. 1999;) pp. 114–125.
Ding and Delrieu(Apr. 1999) Personal care ingredients; Asia; 114–125.

* cited by examiner

*Primary Examiner*—David Brunsman
(74) *Attorney, Agent, or Firm*—Hovey Williams LLP (57) ABSTRACT

Novel modified starch products and methods of preparation thereof are disclosed, wherein the starch products exhibit excellent water hydration and emulsion stabilization properties, while substantially maintaining individual granular structure. The modified starches are expanded or pre-swelled and cross-linked, preferably using a phosphate cross-linker, followed by substitution with hydrophobic moieties such as those derived from suitable acids or acid anhydrides.

37 Claims, 9 Drawing Sheets

Chemical structure of SRS-OSA

Chemical structure of SRS-OSA

EMULSION STABILIZING STARCH PRODUCTS

BACKGROUND OF THE INVENTION

1. Field of the Invention

The present invention is concerned with improved modified starch products and methods of preparation thereof, wherein the starches are preswelled or expanded and both chemically cross-linked and substituted with hydrophobic moieties. The resultant starches exhibit extremely rapid and easy hydration in hot or cold water, and also have excellent emulsion stabilization characteristics. The preferred starches are prepared by initially preswelling and cross-linking native starch, followed by subjecting the preswelled/cross-linked starch to a substitution reaction using a hydrophobic agent such as an acid or acid anhydride.

2. Description of the Prior Art

The preparation of starches including hydrophobic substituent groups is well known. U.S. Pat. No. 2,661,349 describes the preparation of such products by a reaction of starch in an aqueous alkaline slurry and in the presence of a hydrophobic agent. The '349 patent also describes other preparative methods using an organic suspension or discussion.

The esterification of starch with hydrophobic substituents such as octenyl succinic anhydride is described by Trubiano (*Modified Starches: Properties and Uses*, p. 131–147 (1986)) and Rutenburg et al. (*Starch Chemistry and Technology*, 2nd ed. p. 341–343 (1984)). Such prior art substituted starch products tend to swell excessively and fuse together upon discussion in water and heating above the granule melting or gelatinization temperature of the starch. After cooking, these products do not retain granular structure but rather agglomerate to form paste-like systems.

U.S. Pat. No. 5,882,713 describes non-separable compositions of starch and water-immiscible materials by soluablization of starch granules in a stream of water and steam under high turbulence conditions. Such products are characterized as: being stable without phase separation on prolonged standing; forming soft gels upon heating; forming dried, non-oily solids upon drying; and easy hydration in water to form stable and homogeneous dispersions. In the process of the '713 patent, starch is fully solubilized and aligned at the interface of oil and water phases to form thick and gel-like films about oil or lipid droplets.

In 1987 Englyst and Cummings at the MRC Dunn Clinical Nutrition Center in Cambridge, UK, proposed a classification of starch based on its likely digestive properties in vivo. They also devised in vitro assay methods to mimic the various digestive properties of starch. Three classes of dietary starch were proposed:

(1) Rapidly Digestible Starch (RDS). RDS is likely to be rapidly digested in the human small intestine; examples include freshly cooked rice and potato, and some instant breakfast cereals.

(2) Slowly Digestible Starch (SDS). SDS is likely to be slowly yet completely digested in the small intestine; examples include raw cereal starch and cooked pasta.

(3) Resistant Starch (RS). RS is likely to resist digestion in the small intestine. RS is thus defined as the sum of starch and starch degradation products not likely to be absorbed in the small intestine of healthy individuals. RS can be subdivided into four categories depending on the cause of resistance (Englyst et al *Eur. J. Clin. Nutr.* 46(suppl 2):S33, 1992; Eerlingen et al *Cereal Chem.* 70:339, 1993).

$RS_1$. Physically inaccessible starch due to entrapment of granules within a protein matrix or within a plant cell wall, such as in partially milled grain or legumes after cooling.

$RS_2$. Raw starch granules, such as those from potato or green banana, that resist digestion by α-amylase, possibly because those granules lack micropores through their surface.

$RS_3$. Retrograded amylose formed by heat/moisture treatment of starch or starch foods, such as occurs in cooked/cooled potato and corn flake.

$RS_4$. Chemically modified starches, such as acetylated, hydroxypropylated, or cross-linked starches that resist digestion by alpha-amylase. Those modified starches would be detected by the in vitro assay of RS. However, some $RS_4$ may not be fermented in the colon.

$RS_1$, $RS_2$, $RS_3$ are physically modified forms of starch and become accessible to α-amylase digestion upon solubilization in sodium hydroxide or dimethyl sulfoxide. $RS_4$ that is chemically substituted remains resistant to α-amylase digestion even if dissolved. $RS_4$ produced by cross-linking would resist dissolution.

U.S. Pat. No. 6,299,907 describes improved resistant starches which are modified so as to be reversibly swellable. These starch products have a number of novel properties including the capability of undergoing multiple cycles of swelling and drying while substantially retaining the individuality of the starch granules and with the presence of very small amounts of starch solubles. These products also exhibit swelling powers enabling them to absorb water in excess of their own weights. However, when mixed with hot or cold water, these starch products eventually precipitate toward the bottom of the water phase, which may limit wide applicability of the products in water/oil emulsion systems.

U.S. Pat. No. 5,151,264 and Publication U.S. 2002/0168408 describe starch-based vectors used for the transport of biologically active molecules. These vectors include a cross-linked starch core with a first layer or ring of lipid material bonded to the core and a second layer or outer shell of amphiphilic compounds bonded to the lipid layer. However, these references do not describe the use of a preswelled or expanded starch core.

SUMMARY OF THE INVENTION

The present invention provides improved modified starch products which very rapidly hydrate in hot or cold water, while also serving as effective stabilizers in water and water immiscible liquid systems such as water and oil emulsions. The starch products of the invention comprise starch granules which are initially preswelled or expanded and chemically cross-linked arid thereafter substituted with a plurality of hydrophobic moieties normally on the surface of the starch granules. Preswelling and cross-linking of the starch granules can be carried out in a number of ways preferably by a preswelling/cross linking reaction as described in U.S. Pat. No. 6,299,907. However prepared, the cross-linked starch products are then reacted with a hydrophobic agent so as to cause hydrophobic moieties to chemically react with the granules.

Virtually any starch may be modified in accordance with the invention, although the relatively inexpensive starches as wheat and corn starches are preferred. In terms of the cross-linking agent, again the choices are numerous; but for ease of preparation the common phosphate-based cross-linkers are preferred. The hydrophobic agents used in preparation of the starches hereof are usually the acids and acid anhydrides having a straight or branched chain hydrocarbon side chain. The hydrophobic agent is used at a level so that the hydrophobic moieties in the final starch products are present at a level of from about 0.1–50% by weight, based upon the total weight of the starch taken as 100% by weight.

In practice, the modified starches of the invention exhibit remarkable properties. For example, they are capable of hot and cold water hydration at significant levels greatly in excess of conventional starches, and without undo agglomeration or clumping during the hydration process. In addition, the starch products readily disperse in oil/water mixtures without extensive agitation to form essentially homogeneous and stable emulsions which again resist separation for considerable periods at room temperature. These properties, along with the increased surface areas and internal void structure of the starches, render them highly suitable for use as thickening, stabilizing and/or suspending agents, or as vectors for the delivery of biologically active ingredients. Also, dried powders of these starch products have a smooth, silky feel, making them highly desirable for use in diverse products such as cosmetics, pharmaceuticals, baby powders, and deodorant sprays.

It is believed that the swollen and granular morphology of the starch products allows the penetration of water molecules inside the starch granules in aqueous systems. In like manner, in oil and water systems the swollen granular structure of the starch together with the presence of the hydrophobic substitutents enable the formation of very stable oil/water/starch emulsions.

DESCRIPTION OF THE PREFERRED EMBODIMENTS

The starch products of the invention are characterized by extremely rapid hydration in hot or cold water and stabilization of water and water immiscible liquids (e.g., oils). Broadly speaking, the starch products of the invention are prepared in the form of individual starch granules which are expanded or preswelled and chemically cross-linked; these products are then substituted (usually surface-substituted) with hydrophobic moieties or residues. It has been found that the preferred starches of the invention exhibit oil and water emulsion stabilization test results of at least about 2 ml/g, while substantially maintaining the individual granular structure of the starch. Moreover, these preferred starches exhibit the foregoing characteristics over extended storage at room temperature, for example at least about 15 days and usually for at least about 30 days.

A variety of different starches can be modified in accordance with the invention, and indeed essentially any starch can be so modified. Preferable however, the starches are selected from the group consisting of wheat, waxy wheat, corn, waxy corn, high amylose corn, oat, rice, tapioca, mung bean, and potato starches and mixtures thereof.

The starches useful in the invention can be chemically cross-linked in a number of ways using an assortment of different cross-linking agents, such as those selected from the group consisting of sodium, trimetaphosphate (STMP), sodium tripolyphosphate (STPP), phosphoryl chloride, epichlorohydrin and mixtures thereof. However, it is particularly preferred that the cross-linking reaction be carried out by preswelling the starch granules in the presences of an alkali (e.g., alkali metal hydroxide) and a salt (e.g., alkali or alkaline earth metal chloride, sulfate or carbonate). The alkali is present to promote swelling of the starch, whereas the salt is added to prevent excess swelling leading to complete destruction of the granular structure of the salt (i.e., gelatinization). Preferred preswelling/cross-linking conditions and parameters are set forth in U.S. Pat. No. 6,299,907 which is expressly incorporated by reference herein.

In more detail, the most preferred initial cross-linking reaction involves a process of first forming a dispersion of starch granules in water where the granules undergo swelling in the dispersion and have a crystalline phase. A cross-linking agent is added to the dispersion while the granules are swelled in order to cross-link the swelled granules, the cross-linking being carried out under conditions to avoid complete gelatinization of the swelled granules. Thereafter, the cross-linked starch granules are heated in excess water in order to melt the crystalline phase of the granules.

In a preferred procedure, the starch granules are preswelled by first forming a starch/water dispersion and heating the latter in order to swell the granules prior to the addition of the cross-linking agent; the preswelling step is preferably carried out in the presence of a base (such as an alkali metal hydroxide which promotes swelling) and a salt (such as an alkali or alkaline earth metal chloride, sulfate or carbonate). Again, it is important that the preswelling and cross-linking steps be carried out so as to avoid complete gelatinization of the starch granules. Accordingly, the temperature of the starch dispersion during preswelling is generally 5–10° C. below the starch gelatinization temperature. It is also possible to preswell the starch at elevated temperatures, for example 70–80° C. if high concentrations (greater than about 20% based on starch) of salt are used with reduced amounts of base. The hydroxide is normally present at a level of about 1–3% by weight based upon starch, while the salt is used at a level of from about 5–25% by weight on the same basis. The pH of the preswelling system is generally from about 10–12.

During the cross-linking step, the dispersion should have from about 20–40% by weight of starch solids therein. The cross-linking step generally involves heating to a temperature of from about 30–75° C. for a period of from about 0.1–12 hrs., more preferably from about 0.5–2 hr. When the preferred STMP cross-linking agent is used the level of use is typically from about 2–12% by weight, on a dry starch basis. During cross-linking, if an inadequate level of STMP is employed, the starch will eventually gelatinize and cause the reaction mixture to gel. When this occurs, swelling has not been counterbalanced by sufficient inhibition from cross-linking. Increasing the temperature of the cross-linking reaction is a compromise between accelerating the swelling and accelerating the cross-linking reaction, such that gelling of the reaction mixture does not occur prior to sufficient cross-linking in a reasonable period of reaction time. After reacting at a warm temperature usually for several hours, the mixture is neutralized and the starch isolated from the salts to give quantitative product yields. The product exhibits an X-ray diffraction pattern very similar to the starting starch, and a gelatinization temperature somewhat elevated as compared with the parent starch.

In the final preferred preparative step, the partially crystalline, swollen/cross-linked starches are heated in excess water followed by drying in order to melt the crystalline phase. For example, a 10% aqueous slurry of the partially crystalline product may be heated to boiling with stirring for about 5 min. to achieve this end. The boiled product is then cooled and centrifuged. The liquid fraction contains at most 1–2% of the original weight of the partially crystalline modified starch in the form of soluble and damaged starch. If the starches are merely tray dried without removal of the soluble and damaged starch fraction, the product may form a cake-like structure comprised of granules that cling together. In lieu of centrifugation, the starch products may be spray dried.

Although preferred, the above-described preswelling/cross-linking procedure is not essential and suitable starches can be prepared using straightforward cross-linking strategies without preswelling. These cross-linking reactions are entirely conventional and need not be described in detail.

In any case, cross-linked starches are subjected to a substitution reaction with a hydrophobic agent so that hydrophobic moieties or residues become chemically bonded or attached to the surfaces of the starch granules. The preferred substitution reaction is carried out in a aqueous solvent or system, normally using an acid or acid anhydride hydrophobe, especially those of the formula where R is a di- or trimethylene group and R' is a straight or branched chain hydrocarbon group having from about 2–20 carbon atoms therein; preferred agents have from about 6–12 carbon atoms and are selected from the group consisting of straight or branched chain alkyl, alkenyl or alkynl groups. The single most preferred hydrophobic agent is octenyl succinic and hydride (OSA). The hydrophobic agent is used at a level so that the moieties thereof are present in the modified starch at a level of from about 0. 1–50% by weight, based upon the total weight of the starch taken as 100% by weight, more preferably from about 1–30%, and most preferably from about 5–25% by weight.

The substitution reaction is usually carried out at pH of from about 7–11, more preferably from about 8–9. The temperature should be from about 10–50° C. and more preferably from about 25–45° C. Reaction times are variable depending upon the degree of substitution desired, but generally range from about 1–12 hours, more preferably from about 2–6 hours. It is normally preferred that the substitution reaction be conducted with continuous agitation. At the end of the reaction, the reaction mixture maybe neutralized with acid to a pH of from about 5–7, more preferably of about pH 6. Thereafter, the starch products maybe water washed and then gelatinized in a hot aqueous system at a temperature of from about 50–1 50° C., more preferably from about 50–85° C. The final step involves recovery and drying of the modified starch, which is preferably accomplished by spray drying.

The following Examples set forth preferred methods for producing the starch products of the invention. It is to be understood, however, that these Examples are provided by way of illustration only, and nothing therein should be taken as a limitation upon the overall scope of the invention.

FIGS. 1–8 are SEM photographs of a number of the modified starch products described in these Examples. The photographs illustrate the morphology of the starch products.

EXAMPLE 1

This Example describes the production of granular wheat starch cross-linked with 2% STMP and substituted with 25% OSA.

Figure 1:
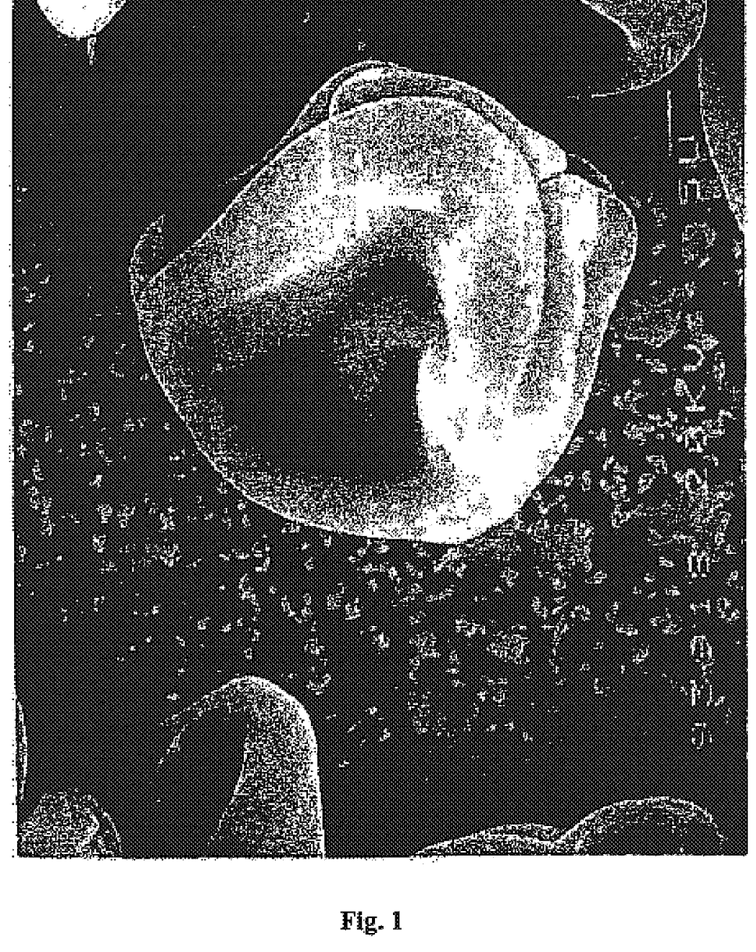
FIG. 1 is a 2000×SEM photograph of conventional reversibly swellable resistant wheat starch (SRS) granules prepared using 2% STMP.
Figure 2:
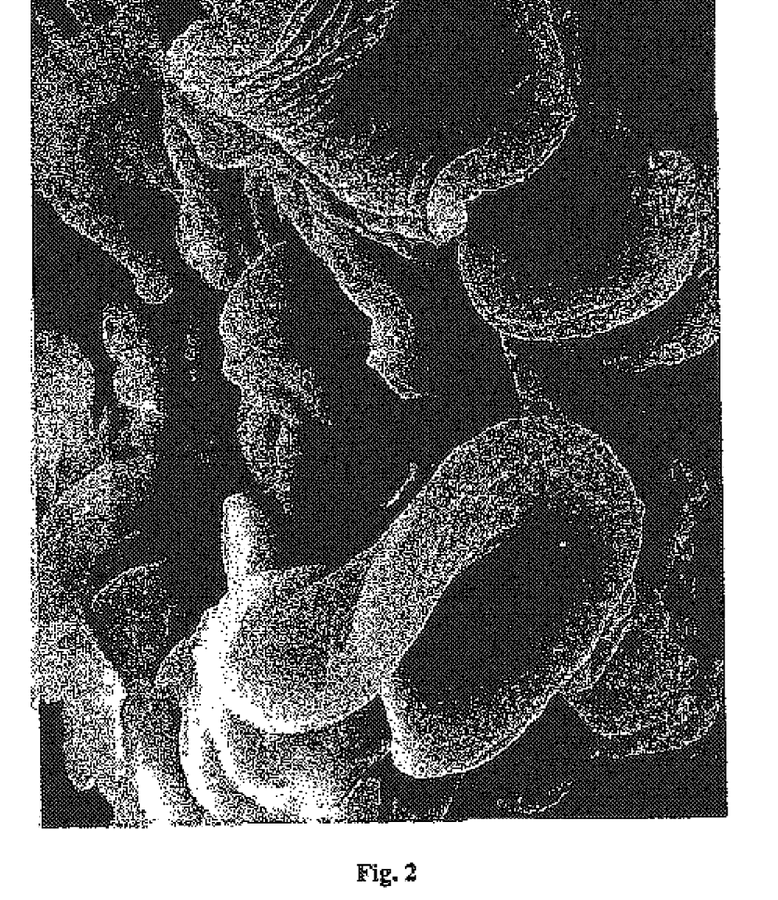
FIG. 2 is a 2000×SEM photograph of modified wheat starch granules in accordance with the invention, prepared using 0.1% STMP and 25% OSA.
Figure 3:
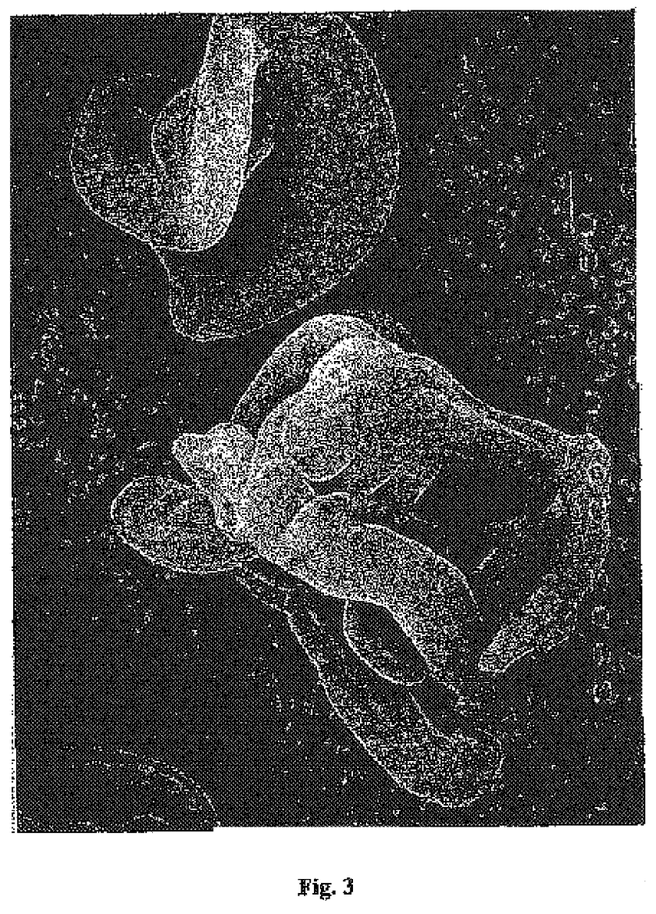
FIG. 3 is a 2000×SEM photograph of modified wheat starch granules in accordance with the invention, prepared using 0.2% STMP and 25% OSA.
Figure 4:
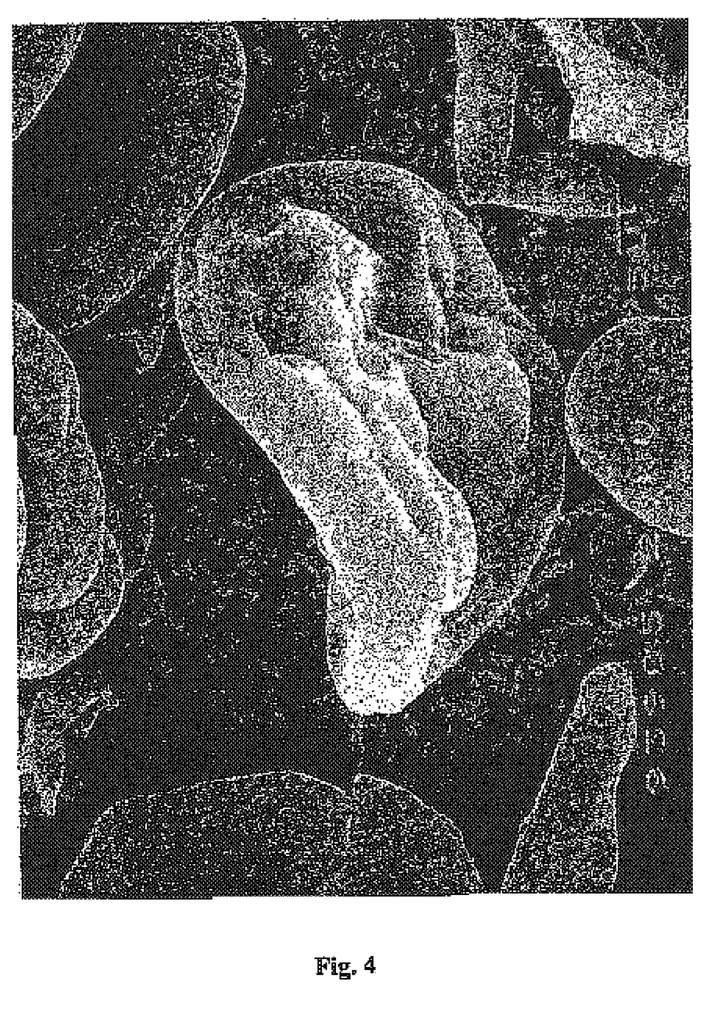
FIG. 4 is a 2000×SEM photograph of modified wheat starch granules in accordance with the invention, prepared using 2% STMP and 25% OSA.
Figure 5:
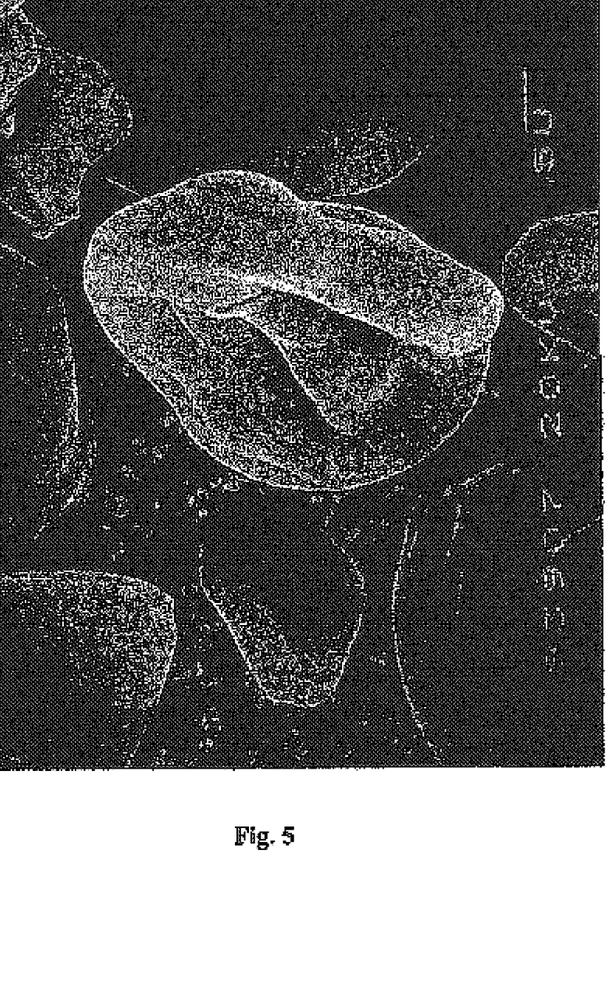
FIG. 5 is a 2000×SEM photograph of modified wheat starch granules in accordance with the invention, prepared using 2% STMP and 10% OSA.
Figure 6:
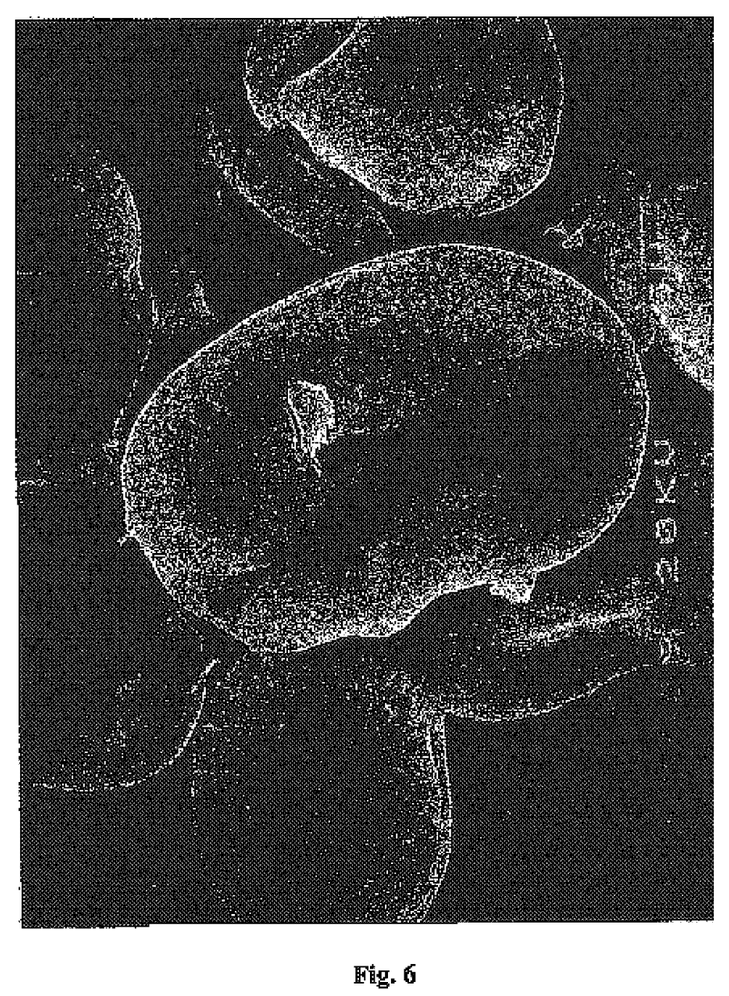
FIG. 6 is a 2000×SEM photograph of modified wheat starch granules in accordance with the invention, prepared using 2% STMP and 5% OSA.
Figure 7:
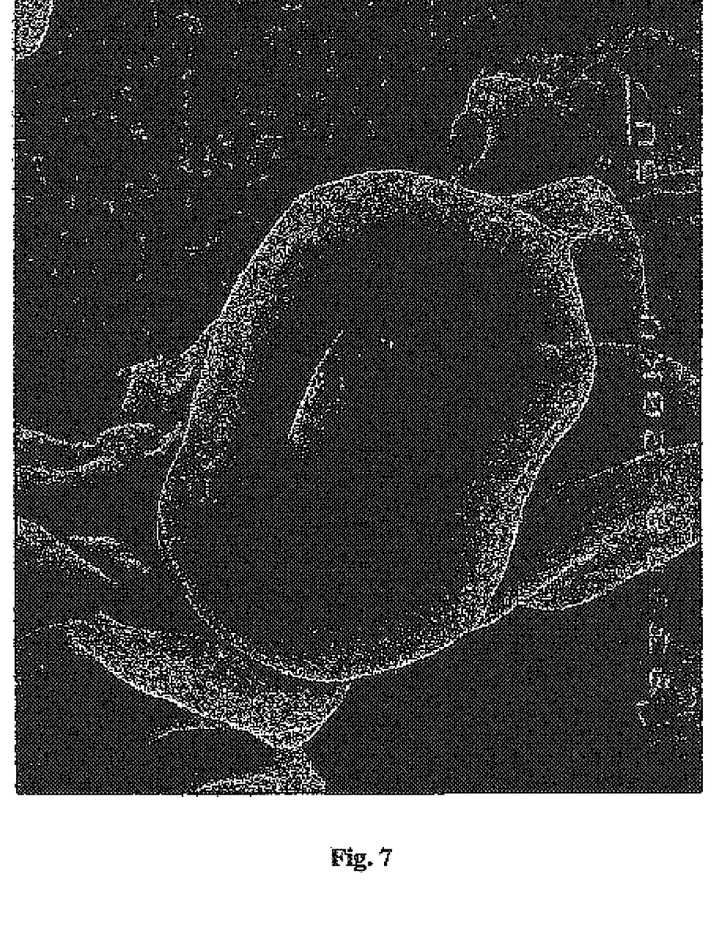
FIG. 7 is a 2000×SEM photograph of modified wheat starch granules in accordance with the invention, prepared using 2% STMP and 1% OSA.
Figure 8:
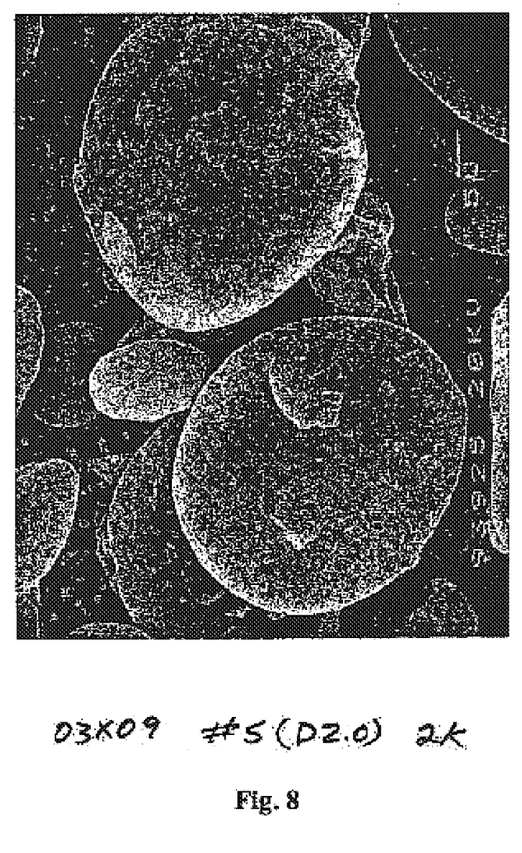
FIG. 8 is a 2000×SEM photograph of modified wheat starch granules in accordance with the invention, prepared using 2% STMP and 2% dodecenyl succinic anhydride (DDSA)
Figure 9:
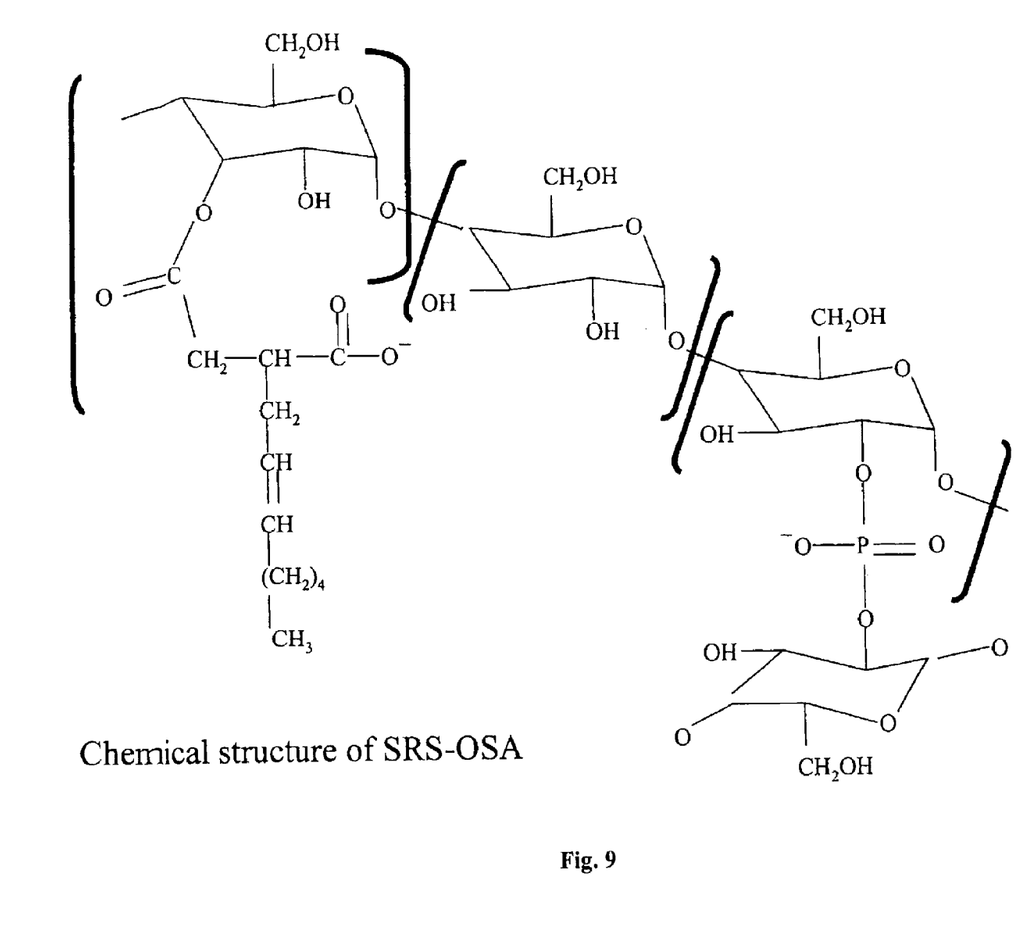
FIG. 9 is a chemical structural representation of a preferred modified starch in accordance with the invention.

In the first step, 100 parts (db) wheat starch were dispersed in 233 parts of water with 10 parts sodium sulfate. This dispersion was warmed to 45° C., whereupon 3 parts of 1M sodium hydroxide aqueous solution were slowly added with continued heating and stirring for 1 hour. Next, 5 parts sodium sulfate and 2 parts STMP were added, followed by continued heating and continuous stirring for 16 hours. The starch slurry was then adjusted to pH 9.0 with sodium hydroxide and then cooled to room temperature (25° C.). 25 parts of OSA were next added to the slurry. The slurry was heated for 4 hours at 45° C. with continuous mixing and pH maintenance at between 8.0–9.0. The reaction mixture was then neutralized with 1M HCl, and the starch was washed 4 times using 1000 parts of water per wash. The recovered starch product was then completely gelatinized by heating at 75° C. for 30 minutes in 1000 parts water. The gelatinized starch was then washed to remove inorganic salts and the final gelatinized starch was recovered by spray drying. FIG. 8 depicts a generalized chemical structure for the SRS-OSA The final product was tested for starch hydration in hot and cold water, and the emulsification characteristics of the starch were tested in a water and oil mixture. In the cold water hydration test, 5 g of starch was dispersed in 100 ml of cold water in a 250 ml beaker. The starch/water mixture was then transferred to a graduated cylinder and the swollen volume was measured after 24 hours. In the hot water test, 5 g of starch was dispersed in 100 ml of cold water, and this mixture was heated at 75° C. for 30 minutes, whereupon the mixture was transferred to a graduated cylinder for measurement after 24 hours. In both cases a swollen volume ratio for the hot and cold water dispersions was determined, by measuring the swollen volume of the starch in the graduated cylinder and dividing this by the dry weight of the starch. Both products gave identical results, a swollen volume ration (v/w) of 6.6 ml/g. These tests are referred to herein as, respectively, cold and hot water hydration tests.

In these cold and hot water hydration tests, the starch was readily dispersed in cold and hot water without clumping or caking, and only moderate stirring was required to form homogeneous dispersions.

The emulsion stability test was performed by dispersing 5 g starch in 100 ml of a 1:1 mixture of water and vegetable (e.g., soybean) oil, followed by heating at 75° C. for 30 minutes. The mixture was then transferred to a graduated cylinder and the swollen volume was measured after 24 hours. This test is referred to herein as the emulsion stability test. In this test, the addition of the starch product of this Example into the water/oil mixture resulted in complete mixing of the two immiscible liquids. The water/oil/starch dispersion was white in color and had a creamy appearance. The mixture was allowed to sit at room temperature for a period of at least 28 days, and no appreciable amount of water or oil separated during this period.

EXAMPLE 2

In this Example a series of modified wheat starch products were made using a constant level of OSA, but with varying amounts of the STMP cross-linking agent. The methods described in Example 1 for the preparation of the starch products, the hot and cold water hydration tests, and the emulsion stability tests were followed in this Example.

The results of these tests are set forth in Table 1:

| Chemical modification | | Swollen volume ratio (v/w) | | |
|---|---|---|---|---|
| Cross-linking (STMP, sb) | Substitution (OSA, sb) | Cold Water | Hot Water | Oil/Water Emulsion |
| 2.0% | 25% | 6.6 | 6.6 | Completely mixed |
| 0.5% | 25% | 9.6 | 9.6 | Completely mixed |
| 0.2% | 25% | 7.8 | 10 | Completely mixed |
| 0.1% | 25% | 8.4 | 11.8 | Completely mixed |

EXAMPLE 3

A series of modified wheat starch products were prepared as set forth in Example 2 using varying amounts of STMP cross-linking agent and a constant level of OSA. These products were tested for hot and cold water hydration and emulsification, and were compared against standard reversibly swellable starch without OSA substitution. The methods of Example 2 were followed in these tests, except that the emulsion stability test was carried out with a low solids content, namely 2 g of starch disbursed in 100 ml of a water/oil mixture.

| Cross-linking STMP (%, sb) | Substitution OSA (%, sb) | Swollen volume ratio (v/w) | | | |
|---|---|---|---|---|---|
| | | Cold Water | Hot Water | Oil/Water Precipitated | Starch/Oil/Water Stabilized |
| | | SRS[a] | | | |
| 2 | — | 4.8 | 4.8 | 10.7 | None |
| | | SRS-OSA[b] | | | |
| 2 | 25 | 6.6 | 6.6 | 17 | 30 |
| 0.5 | 25 | 9.6 | 9.6 | 6 | 26.5 |
| 0.2 | 25 | 7.8 | 10 | None | 38 |
| 0.1 | 25 | 8.4 | 11.8 | None | 42.5 |

[a]SRS: Reversibly Swellable Resistant Starch
[b]SRS-OSA: Reversible Swellable Resistant Starch substituted with octenyl succinic anhydride.

As shown above, the unsubstituted reversibly swellable starch product gave inferior results, particularly in the emulsification test where very little if any emulsification was observed.

In the low solid content emulsion stability tests, the starch product was dispersed in the oil layer and floated on top of the water layer.

EXAMPLE 4

In this Example three modified wheat starch products were prepared as set forth in Example 1, except that the level of OSA was much lower, namely 1, 5, and 10% respectively, as compared with 25% in Example 1.

EXAMPLE 5

In this Example modified wheat starch products were prepared a set forth in Example 1, except that phosphoryl chloride added at levels of 0.5 and 1% was used in lieu of STMP.

EXAMPLE 6

In this case a modified corn starch product was prepared. 100 parts corn starch were dispersed in 233 parts water with the addition of 10 parts sodium sulfate. The dispersion was warmed to 55° C. and 3 parts of an aqueous 1 M sodium hydroxide solution were slowly added with stirring for 1 hour at temperature. Thereafter, 5 parts sodium sulfate and 2 parts STMP were added with continuous stirring over 16 hours at temperature. The starch slurry was adjusted to pH 9 with sodium hydroxide, and cooled to room temperature (25° C.). 25 parts OSA were then added to the slurry and the pH was maintained between 8.0–9.0 for 4 hours with continuous stirring. After neutralization of the reaction mixture with 1M HCl, the starch was washed 4 times with 1000 ml water and spray dried. The swollen modified starch was completely gelatinized by heating in 1000 parts water at 75° C. for 30 minutes. The final product was covered by spray drying.

EXAMPLE 7

In another test, a modified wheat starch product was produced as set forth in Example 1 except that dodecenyl succinic anhydride was used instead of OSA. This modified starch was suspended in 100 parts water with agitation and 2 parts aluminum sulfate was dissolve therein.

After 30 hours of room temperature agitation the starch derivative was filtered, water washed and recovered.

We claim:

1. A modified starch comprising expanded or preswelled chemically cross-linked starch granules substituted with a plurality of hydrophobic moieties, said starch having a degree of cross-linking adequate to prevent gelling of the starch.

2. The starch of claim 1, said granules being cross-linked with a chemical cross-linking agent selected from the group consisting of sodium trimetaphosphate, sodium tripolyphosphate, phosphoryl chloride, epichlorohydrin and mixtures thereof.

3. The starch of claim 1, said hydrophobic moieties being present at a level of from about 0.1–50% by weight, based upon the total weight of the starch taken as 100% by weight.

4. The starch of claim 3, said level being from about 1–30%.

5. The starch of claim 4, said level being from about 5–25%.

6. The starch of claim 1, said moieties derived from hydrophobic acids and acid anhydrides.

7. The starch of claim 6, said moieties derived from acid anhydrides of the formula wherein R is a di- or trimethylene group and R' is a straight or branched chain hydrocarbon group having from about 2–20 carbon atoms therein.

8. The starch of claim 7, wherein R' is a straight or branched chain alkyl, alkenyl or alkynl group.

9. The starch of claim 8, wherein R' has from about 6–12 carbon atoms therein.

10. The starch of claim 1, said starch having an oil and water emulsion stability of at least about 5 ml/g, with the granules substantially maintaining their granular structure.

11. The starch of claim 10, said starch having an essentially completely mixed oil and water emulsion stability with the granules substantially maintaining their granular structure.

12. The starch of claim 1, said moieties derived from octenyl succinic anhydride.

13. The starch of claim 1, said starch granules selected from the group consisting of wheat, waxy wheat, corn, waxy corn, high amylose corn, oat, rice, tapioca, mung bean, and potato starches and mixtures thereof.

14. A method of modifying starch comprising the steps of:
providing chemically cross-linked starch granules, said granules having a degree of cross-linking adequate to prevent gelling of the starch; and
reacting said starch granules with a hydrophobic agent, and causing hydrophobic moieties derived from said agent to chemically react with the granules.

15. The method of claim 14, said reaction being carried out in a aqueous system having a pH of from about 7–11.

16. The method of claim 15, said pH being from about 8–9.

17. The method of claim 14, said reaction being carried out at a temperature of from about 10–50° C.

18. The method of claim 17, said temperature being from about 25–45° C.

19. The method of claim 14, said granules being cross-linked with a chemical cross-linking agent selected from the group consisting of sodium trimetaphosphate, sodium tripolyphosphate, phosphoryl chloride, epichlorohydrin and mixtures thereof.

20. The method of claim 14, said hydrophobic moieties being present at a level of from about 0.1–50% by weight, based upon the total weight of the starch taken as 100% by weight.

21. The method of claim 20, said level being from about 1–30%.

22. The method of claim 21, said level being from about 5–25%.

23. The method of claim 14, said moieties derived from hydrophobic acids and acid anhydrides.

24. The method of claim 23, said moieties derived from acid anhydrides of the formula wherein R is a di- or trimethylene group and R' is a straight or branched chain hydrocarbon group having from about 2–20 carbon atoms therein.

25. The method of claim 24, wherein R' is a straight or branched chain alkyl, alkenyl or alkynl group.

26. The method of claim 25, wherein R' has from about 6–12 carbon atoms therein.

27. The method of claim 14, said starch having a cold oil and water emulsion stability of at least about 5 ml/g, with the granules substantially maintaining their granular structure.

28. The method of claim 14, said starch having a hot oil and water emulsion stability of at least about 5 ml/g, with the granules substantially maintaining their granular structure.

29. The method of claim 14, said moieties derived from octenyl succinic anhydride.

30. The method of claim 14, said starch granules selected from the group consisting of wheat, waxy wheat, corn, waxy corn, high amylose corn, oat, rice, tapioca, mung bean, and potato starches and mixtures thereof.

31. The method of claim 14, including the steps of gelatinizing said starch after said reacting step.

32. The method of claim 31, said gelatinization being carried out in an aqueous system at a temperature of from about 50–150° C.

33. The method of claim 32, said temperature being from about 60–85° C.

34. A modified starch comprising expanded or preswelled chemically cross-linked starch granules substituted with a plurality of hydrophobic moieties, said moieties derived from acid anhydrides of the formula wherein R is a di- or trimethylene group and R' is a straight or branched chain alkyl, alkenyl or alkynl group having from about 6–12 carbon atoms therein.

35. A modified starch comprising expanded or preswelled chemically cross-linked starch granules substituted with a plurality of hydrophobic moieties, said moieties derived from octenyl succinic anhydride.

36. A method of modifying starch comprising the steps of:
providing chemically cross-linked starch granules;
reacting said starch granules with a hydrophobic agent, and causing hydrophobic moieties derived from said agent to chemically react with the granules,
said moieties derived from acid anhydrides of the formula wherein R is a di- or trimethylene group and R' is a straight or branched chain alkyl, alkenyl or alkynl group having from about 6–12 carbon atoms therein.

37. A method of modifying starch comprising the steps of:
providing chemically cross-linked starch granules;
reacting said starch granules with a hydrophobic agent comprising octenyl succinic anhydride, and causing hydrophobic moieties derived from said octenyl succinic anhydride to chemically react with the granules.

* * * * *